United States Patent [19]
Pecht et al.

[11] Patent Number: 6,142,478
[45] Date of Patent: Nov. 7, 2000

[54] GAS LUBRICATED SLOW SPEED SEAL

[75] Inventors: Glenn G. Pecht, Vernon Hills, Ill.; John P. Czubek, Genoa City, Wis.; Ralph P. Gabriel, Gurnee, Ill.; Anca Vasilache, Skokie, Ill.; Robert Peter Rieger, Lombard, Ill.; James R. Wasser, Gurnee, Ill.

[73] Assignee: John Crane Inc., Morton Grove, Ill.

[21] Appl. No.: 09/020,493

[22] Filed: Feb. 6, 1998

[51] Int. Cl.[7] .................................................. F16J 15/54
[52] U.S. Cl. ............................................................. 277/400
[58] Field of Search ............................................. 277/400

[56] References Cited

U.S. PATENT DOCUMENTS

| | | |
|---|---|---|
| 2,623,357 | 12/1952 | Birmann . |
| 3,499,653 | 3/1970 | Gardner ................................. 277/400 |
| 3,527,465 | 9/1970 | Guinard . |
| 3,640,541 | 2/1972 | Taschenberg ......................... 277/400 |
| 3,751,045 | 8/1973 | Lindeboom . |
| 4,095,806 | 6/1978 | Dempsey . |
| 4,212,475 | 7/1980 | Sedy . |
| 4,290,611 | 9/1981 | Sedy . |
| 4,645,414 | 2/1987 | DeHart . |
| 4,768,790 | 9/1988 | Netzel . |
| 4,799,693 | 1/1989 | Johnston ................................. 277/400 |
| 5,066,026 | 11/1991 | Heck et al. ............................ 277/400 |
| 5,071,141 | 12/1991 | Lai . |
| 5,090,712 | 2/1992 | Pecht . |
| 5,174,584 | 12/1992 | Lahrman ................................. 277/400 |
| 5,180,173 | 1/1993 | Kimura et al. ......................... 277/400 |
| 5,201,531 | 4/1993 | Lai . |
| 5,217,233 | 6/1993 | Pecht . |
| 5,333,882 | 8/1994 | Azibert et al. . |
| 5,375,853 | 12/1994 | Wasser . |
| 5,441,283 | 8/1995 | Pecht et al. ............................ 277/400 |
| 5,447,316 | 9/1995 | Matsui .................................... 277/400 |
| 5,468,002 | 11/1995 | Wasser . |
| 5,496,047 | 3/1996 | Goldswain . |
| 5,605,339 | 2/1997 | Pecht . |
| 5,702,110 | 12/1997 | Sedy ....................................... 277/400 |
| 5,713,576 | 2/1998 | Wasser et al. ....................... 277/400 X |
| 5,722,665 | 3/1998 | Sedy et al. ............................ 277/400 |

FOREIGN PATENT DOCUMENTS

| | | |
|---|---|---|
| 0089698 | 3/1982 | European Pat. Off. . |
| 0 466 076 | 1/1992 | European Pat. Off. . |
| 39 01 362 | 7/1990 | Germany . |
| 43 03 050 | 9/1993 | Germany . |
| 60-222667 | 7/1985 | Japan . |
| 1719756-A1 | 3/1992 | U.S.S.R. . |

OTHER PUBLICATIONS

"Principles and Design of Mechanical Face Seals," A. O. Lebeck, John Wiley and Sons Co., Inc., New York, N.Y., 1991, pp. 661–663.

*Primary Examiner*—Anthony Knight
*Assistant Examiner*—Karlena D. Schwing
*Attorney, Agent, or Firm*—McEachran, Jambor, Keating, Bock & Kurtz

[57] ABSTRACT

A contacting mechanical end face seal for use in applications having slow shaft rotational speeds, such as mixers, agitators and reactors, includes at least one seal ring having a face with spiral grooves. Both hydrostatic and hydrodynamic lift characteristics in the seal are utilized to generate and maintain a seal gap having sufficient stiffness to prevent contact of the seal ring faces during operation. Specific characteristics, or combinations of them, include a land to groove ratio between 0.2–0.9, tapered groove surfaces which are inclined from the O.D. toward the dam, groove area to land area ratios greater than 1.5, a stepped groove having a greater depth at the O.D. relative to the depth adjacent the dam, alternating deep and shallow grooves, and groove area to dam area ratio in the interface greater than 1.2. Disposing the grooves in the axially movable primary ring and providing a greater sealing area for the opposing mating ring seal face limits angular load imbalance in the seal by maintaining the grooved area within the seal interface. The seal may be utilizable in both single or dual seal arrangements.

30 Claims, 6 Drawing Sheets

GAS LUBRICATED SLOW SPEED SEAL

BACKGROUND OF THE INVENTION

1. Field of the Invention

This invention relates generally to non-contacting mechanical end face seals and more specifically to seals which are used in applications where shaft rotational speeds are slow, as in mixers, agitators, and reactors and certain specialty slow speed pumps.

2. Background Art

Mechanical end face seals of the non-contacting type have become high technology items utilizable in a variety of industries. These type of seals are designed with a great deal of care and attention to the materials, shapes, dimensions and tolerances of the component parts. Such attention to detail in the design is necessary in order to accommodate a great number of parameters and characteristics, any of which parameters and characteristics will affect the efficiency or operation of these seals.

Minor changes or alterations to any one of about 100 physical features of a seal, its components or its sealing environment may, and in most cases will, result in a change in the characteristics of a seal, such as sealing capability, wear, endurance and/or seal integrity. In most cases, it is desirable for seals of this type to operate without maintenance and trouble for extensive periods of time, preferably on the order of years. Failure of such seals often leads to plant upset and even shutdown. The seals are used in machinery which cannot be shut down for long without severely impairing the operation and efficiency of, for example, a large mixer used in a processing plant.

Seals of this type may be utilized in single, dual or double seal arrangements. The dual or double arrangement of the two seals are normally spaced apart axially along a shaft passing through an aperture in a housing. Dual seals include a barrier fluid in the intermediate chamber defined by the housing and by the two seals, the buffer fluid being neutral relative to the environment, to the product being sealed and to the materials comprising the seal elements.

An arrangement of double seals is described in commonly owned U.S. Pat. No. 5,375,853, which is hereby incorporated by reference. U.S. Pat. No. 5,375,853 illustrates and describes a dual non-contacting type seal arrangement having a relatively inert gas, such as nitrogen, as the buffer fluid. The buffer gas is at a high pressure in excess of the pressure of the sealed liquid within the housing.

For particular applications, such as in mixers, severe or extreme conditions arise, for example, the sealed fluid may have a high viscosity. In a mixer having a very long shaft, the shaft runout is usually much greater than in an application in which the shaft is bearing contained and is of shorter length. For seals in use with mixers of this type, extreme shaft runout must be accommodated or the seal will lose its effectiveness and possibly its integrity after a short period of use.

It has been found that seals of the type described and illustrated in U.S. Pat. No. 5,375,853 operate well in most applications. However, because the seal arrangements made in accordance with that patent were developed for predetermined rotational speed and pressure conditions, limitations arise in the event that the shaft rotational speed is decreased below a presently predetermined limit of about 400 feet/minute.

Another requirement is that any seal must provide liftoff capability, which may become problematic when the shaft rotates at low rotational speeds. In normal applications, a gas lubricated seal is mounted on a shaft that rotates well above 1,200 rpm. At such speeds, pumping action from conventional spiral grooves operates adequately to provide liftoff between the seal faces during normal operation, and the seal operates to effectively limit leakage.

Accommodations must be provided in the seal face geometry and in the spiral groove geometry for applications in which the shaft operates at low rotational speeds. Liftoff between the seal faces is preferable at an early period in the commencement of shaft rotation. A seal having decreased liftoff capability, or liftoff which ensues well after the shaft has begun rotating at a minimum speed, sometimes results in seal face contact during operational conditions. The period during shut down or start up of the device utilizing the seal is especially liable to present conditions in which seal faces contact. Such face contact is undesirable because it leads to excessive wear and to ineffectiveness of the seal soon after a short period of normal operation.

What is thus necessary is a seal which can provide seal liftoff capability at low rotational speeds and can accommodate greater than normal shaft runouts so as to enable use of the seal in a great many heretofore difficult applications, such as in mixers, agitators and reactors.

DETAILED DESCRIPTION OF THE PREFERRED EMBODIMENT

Conventional gas lubricated seals for sealing against leakage along a rotating shaft extending through a housing have been used in a variety of applications. For example, commonly assigned U.S. Pat. Nos. 4,212,475 and 5,217,233 disclose gas lubricated mechanical face seals for sealing gas at high pressures and extremely high pressures, respectively. Such seals are normally used in compressors and the like equipment, all of which have high shaft rotational speeds and very low runout. Additionally, shaft bearings may be disposed adjacent the seals to reduce runout and to maintain a true rotation of the equipment shaft around its centerline. Lift-off of the seal faces in the start up of shaft rotation is soon effected because sufficient pressurized gas is pumped between the seal faces by the pumping grooves of one of the seal ring faces. Judicious selection of other seal parameters results in continual strong pumping of gas into the seal gap, to provide high gas film stiffness and to provide a stable seal gap.

For low rotational speeds, it is necessary to take into account the lesser amount of lubricating gas which is being pumped into the gap in order to achieve lift-off. Maintaining a sufficient pressure of the lubricating gas within the seal gap is a necessity. Additionally, a stable seal gap must be maintained, and the wobble of one seal face relative to the other must be minimized during shaft rotation. For slower speeds and/or in equipment having a higher degree of shaft runout, high load imbalance is likely to occur much more frequently, leading to seal face contact and eventually resulting in seal failure. Accordingly, for seals used in slow shaft speed applications in which non-contacting operation is desired, it is required to pump a sufficient amount of gas into the seal gap to maintain gas film stiffness and seal gap separation while simultaneously maintaining the leakage through the seal gap at a minimum. Additionally, the structural design of a seal for use in slow rotational speed applications, such as in mixers, agitators or reactors must accommodate an expected large degree of runout.

Spiral grooves on the seal face of the seal ring which is connected to the shaft can and often does create instability in the seal gap due to uneven balance characteristics. For example, a standard mechanical face seal, such as is illustrated and described in aforementioned U.S. Pat. No. 4,212,475, includes a seal ring having spiral grooves which are disposed on the mating ring. A seal balance results from the predetermined disposition of the secondary seal on the back face of the axially movable primary ring with relation to the fluid pressures acting on predetermined areas of the primary ring back face. With judicial selection of the sealing diameter or diameters of the secondary seal, the closing forces acting on the primary ring may be balanced against the opening force of the gas pressures developed by the pumping action of the spiral grooves.

Figure 1A:
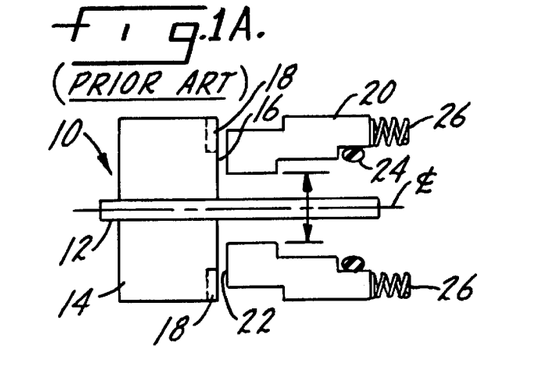
FIGS. 1A and 1B are schematic diagrams, respectively, of a conventional, non-contacting seal having a seal interface concentric with the shaft and the resulting equal loading pressure profile.
Figure 1B:
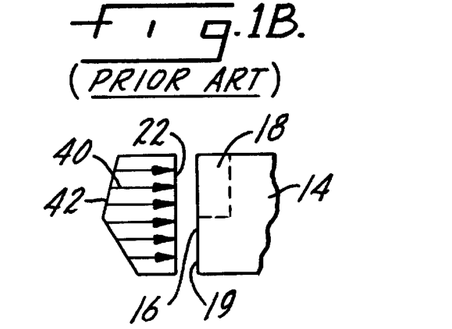
Figures 2A, 2B, 3:
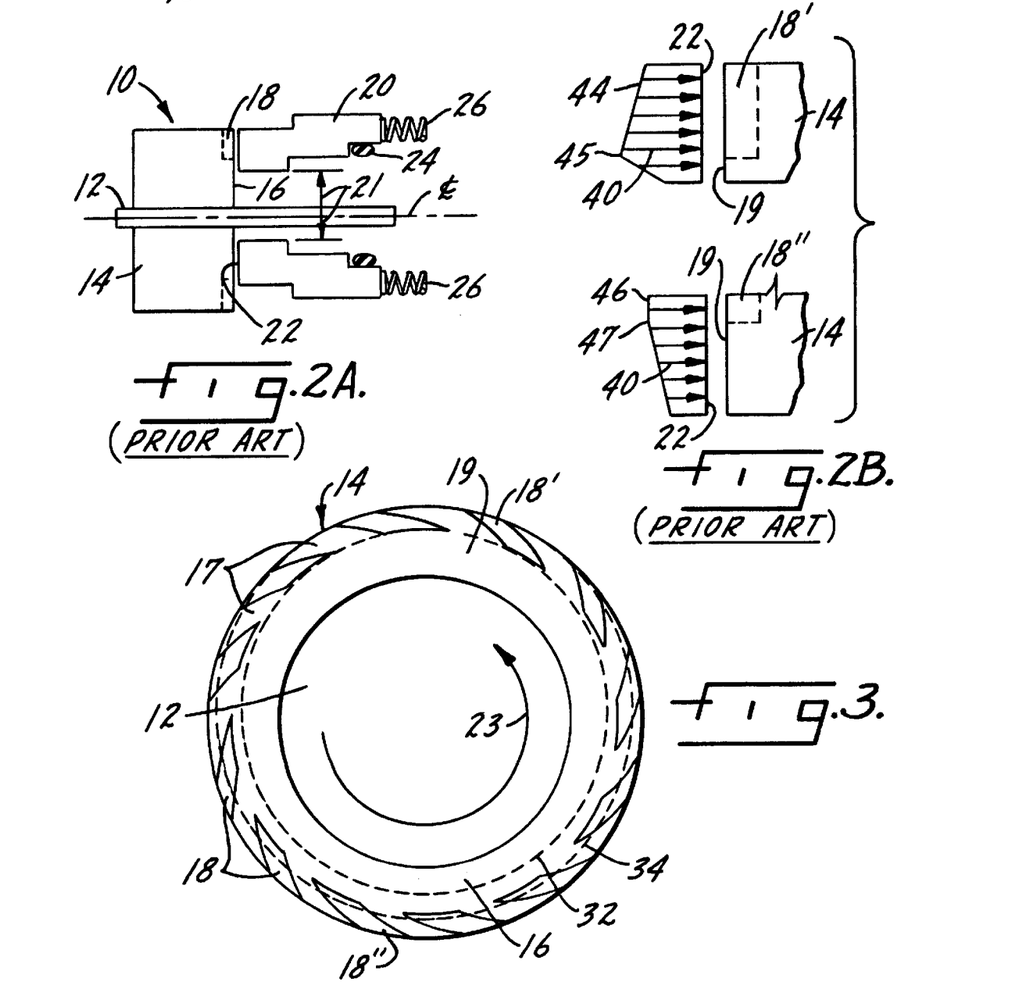
FIGS. 2A and 2B are schematic drawings of a conventional non-contacting seal experiencing large runout where the seal interface is not concentric with the shaft and the resulting unequal loading pressure profile, respectively.
FIG. 3 illustrates the face of a conventional non-contacting mating ring, with the seal interface shown in phantom.

Equipment having excessive shaft runout may also give rise to unwanted sealing difficulties. Referring to the schematic diagrams illustrated in FIGS. 1A, 1B, 2A and 2B, a conventional seal configuration and the resultant pressure profiles are shown. FIGS. 1A and indicate the case of true alignment of the seal rings with the shaft centerline CL for a configuration having essential concentricity of the seal ring faces. FIGS. 2A and 2B indicate the case of a skewed alignment of one ring relative to the shaft centerline and the other ring, thus resulting in a high degree of shaft runout, as indicated by the arrow 23 in FIG. 3.

The schematic diagram of seal 10 shown in FIG. 1A comprises two rings, one of which is attached to a shaft 12 that rotates relative to the other ring. The other ring is attached to a device housing (not shown) through a retainer means (not shown). In most respects, the conventional seal 10 includes an arrangement similar to that illustrated and described in aforementioned U.S. Pat. No. 4,212,475, the description of which is incorporated herein by reference. The shaft 12 normally extends through a bore in the housing (not shown) and the seal 10 provides a seal to prevent leakage of fluids through the bore along the shaft 12.

The rotary seal ring 14 is attached and sealed to the shaft 12 to rotate with shaft 12. A secondary seal (not shown) is in most cases sufficient to seal any leakage path which may occur between the ring 14 and the shaft 12. As shown in FIGS. 1A and 2A, the conventional seal has a rotary seal ring 14 that includes a seal face 16 having conventional spiral grooves 18, shown in phantom in FIGS. 1A, 1B.

The other ring 20, referred to as a primary ring 20, is normally stationary relative to the housing (not shown) and is axially movable relative thereto. Primary ring 20 includes a seal face 22 in opposing mating relation to the seal face 16 of the rotary mating ring 14. A portion of the seal face 22 of the primary ring 20 overlaps with a portion of the seal face 16 of the mating ring 14 to define a seal interface or a seal interface area. During periods of seal ring concentricity, the seal interface area is in the shape of a uniform annular ring having smooth circles for both the inside and outside diameters, to result in a stable gap and uniform gas pressure load in the seal gap.

The seal interface partially overlaps a portion of the mating seal face 16 which includes the grooves 18 and partially overlaps over an ungrooved area, also referred to as a dam 19. In the schematic rendition of the seal in FIGS. 1A, 2A, the dam 19 is disposed on the inside diameter of the interface area. It is well known in the sealing art, however, that the dam may be disposed adjacent the outer diameter and the grooves may be disposed adjacent the inner diameter, without reducing the effectiveness of the seal; for example, see commonly assigned U.S. Pat. No. 5,529,315. It is also known that the primary ring may be configured to rotate with the shaft, and the mating ring may be stationary; see, for example, commonly assigned U.S. Pat. No. 5,375,853.

Seal 10 further includes a secondary seal 24, such as an O-ring, as shown, to seal the axially movable primary ring 20 at its inside diameter to the housing (not shown) on a retainer assembly (not shown). A biasing means 26, such as a plurality of equidistantly disposed springs, axially bias the primary ring 20 and which biasing force tends to bring the seal faces 16,22 into an opposing mating, sealing relationship. Preferably, the primary ring 20, the secondary seal 24 and the springs 26 are all assembled and disposed in a retainer (not shown in FIGS. 1–5). For a detailed description of the retainer assembly (not shown) and its relation and operation with the primary ring 20, reference is again made to aforementioned U.S. Pat. No. 4,212,475, or to commonly assigned U.S. Pat. No. 4,768,790.

Some seal applications experience a large degree of shaft runout. Industrial mixers, for example, have large shafts which may exceed 30 feet in length. In large vertical mixers, the mixer shaft is vertically disposed and extends through a bore at the top of the mixer. A large horsepower, low speed motor is attached to the shaft. The shaft experiences a large degree of radial deviation at the mixer end, which by is translated to a much lesser degree to the end adjacent the seal and the motor. Mounting of the seal rings on the housing and around the shaft also is not always accurate. The bearings upon which the shaft is disposed have one axis, which necessarily translates into the axis of rotation of the shaft. However, the mixer housings are not always manufactured to exact tolerances. Any deviation in the dimensions of the mixer housing or mounting mechanism, such as a retainer, can translate into an eccentric disposition of the mating ring. The mating ring disposition, eccentrically mounted, can cause non-concentricity between the two seal ring faces, resulting in non-overlap of the groove area and the interface.

Both the shaft runout phenomenon and the non-concentric seal face disposition result in the seal face of one seal face having an eccentric position relative to the other. Both of these conditions can result in skewing of the seal faces relative to each other because of the difference in fluid pressure developed by the grooves pumping more gas at one angular position of a seal interface than at another. Excess leakage is caused by the larger gap opening at one angular seal face portion relative to the other.

Although both seal face eccentricity phenomena cause the seal faces to lose their parallel orientation to each other, the effects which result are varied. The difference between the two phenomena is that in the skewed mating ring case, non-concentric seal rings the angular position of the seal face edge portion that is closest to the circumferential edge of the other face retains its angular position relative to the housing. The skewed angular position changes in a seal runout situation differs by rotating about the seal interface in synchronization with the shaft rotation.

One solution normally resorted to is stabilization of the shaft during rotation. The shaft may be further retained by a shaft bearing at the vertical end, but the bearing must be disposed outboard of the seal. Placing a bearing within the mixer at the mixing end of the shaft is not preferred because the material in the mixer will impede the bearing operation and quickly make it ineffective. Bearings also cannot be used within the housing of a vertical shaft because the lubricating medium in the bearings, usually oil or grease, will leak out and into the product being mixed, thereby contaminating it. The shaft extends into the mixer housing and normally cannot be supported by bearings within the housing. Although contained bearings have been utilized within a mixing chamber, these are not preferred because of the need to enclose and hermetically seal these bearings in isolation from the mixed product. Products such as food or drug mixtures, which must be maintained pure of contamination, cannot be subjected to oil leakage. Thus, disposition of the shaft bearings outside the mixing chamber is a necessity, which the present invention can accommodate.

Another application for seals made according to the present invention is for horizontally mounted mixers in which the shafts are mounted horizontally relative to the mixer housing. This application challenges the ability to provide effective sealing because a horizontal shaft is further subject of the lateral forces of gravity acting on the shaft and on the product mixture, which results in further instability and eccentric shaft rotation, and the consequent instability in the seal face gap. Seals made according to the present invention take into account these instabilities, as well as the expected slow shaft rotation, and continue to provide a effective seal over long periods of continual use.

Referring now to FIGS. 2A and 3, the identical seal 10 is illustrated, with certain relative positional differences in the seal rings. The main difference between the seal 10 in FIG. 1A relative to FIGS. 2A and 3 is the orientation of the shaft 12 and mating ring 14 relative to the primary ring 20. Radial displacement at the mixer end can be variable, depending on a variety of factors. Non-concentric alignment of the seal rings, due to fixture misalignment or other discrepancies in the stationary seal ring mounting, can cause radial displacement. Shaft runout or wobble can also cause moving radial seal face displacement.

The potentially high viscosity of the product being mixed causes the mixer to rotate slowly and with great radial displacement at the produce end which translates to a lesser amount of radial displacement at the shaft end adjacent the seal. As shown schematically in FIG. 2A, the shaft radial displacement may be large enough to unbalance the seal because the forces arising out of the pressure differences at different sections of the seal face 16. The degree of radial displacement is exaggerated in FIGS. 2A and 3 for purposes of illustrating the principles of the present invention, the amount of which is shown by the leader lines 21. The seal face 16 of seal ring 14 becomes radially displaced relative to the primary ring seal face. The seal interface, comprising a conventional mating ring, is shown in phantom in FIG. 3 by an inner diameter line 32 and an outer diameter line 34.

The radial displacement of one seal face relative to the other changes the opening forces which are developed by the spiral grooves acting on different sections of the seal interface. That is, for an angular section in which the seal interface covers a greater portion of the groove area, shown in FIG. 3 at the top of the seal face 16, more of the lubricating gas is pumped into the seal gap by the grooves 18' than by the grooves 18 at the opposite angular side, at the bottom of the seal face 16.

FIG. 2B shows the imbalance in opening forces which result from the uneven pumping action of the grooves, which leads directly to instability in the seal gap. Such instability in the seal gap causes almost instantaneous tilting of one seal face 22 relative to the other 16. Rotation of the shaft 12 and of the seal faces relative to each other creates instability in the seal gap which may cause the seal faces 16,22 to come into contact with each other. Rubbing contact, during rotation of the shaft, is generally considered detrimental to a non-contacting seal arrangement because such contact causes wear and leads to further instability in the seal due to frictional heat generated by the rubbing contact.

Referring again to FIGS. 1B, 2B and 3, the effects of large runout or seal face non-concentricity are graphically illustrated. FIG. 1B shows the mating seal ring 14 having a seal face 16 and spiral grooves 18 separated by lands 17 (FIG. 3), shown with exaggerated depth in opposing mating relation with the seal face 22 of the primary ring 20 in FIGS. 1B and 2B. The opening force generated by the radially inward pumping action of the grooves 18 is graphically shown by arrows 40 extending to the primary ring seal face 22. The length of each of arrows 40 is indicative of the force generated by the pressure, at that radial location, of the gas as it is pumped by groove 18.

The amount of force generated by the fluid gas film pressure is graphically represented by the area between the left boundary of the pressure profile boundary 42 and the seal face 22. For the case of a centered seal face configuration, representing a condition of essentially no runout, the amount of force generated, i.e., the area between boundary 42 and line 22, is essentially identical all around the seal interface area, irrespective of angular direction.

When runout or seal face non-concentricity are excessive, however, the primary seal ring becomes unbalanced due to a difference in the force, attributable to the difference in the amount of gas being pumped by the spiral grooves. This difference develops when a greater amount of gas is pumped at one angular section than at another.

Referring now to FIG. 3, it is evident that if the seal interface area, represented by the dotted lines 32, 34, is unevenly distributed in the facing engagement against the opposed mating ring seal face 16, one angular section of seal face will have substantially all of the area over which the grooves 18 extend overlaps with the opposing seal face between the lines 32,34 shown in phantom. That portion is shown at the top of the seal face 16 as illustrated in FIG. 3. Conversely, the lower section of the seal face 16 has grooves 18" which are hardly overlapped by the seal interface area between lines 32, 34. Thus, little, if any, gas can be pumped by the grooves 18" into the seal gap at that portion of the seal interface area.

The lesser amount of gas being pumped into the seal gap is graphically shown in the two representations of the seal face areas shown in FIG. 2B. The top portion of the seal interface of FIG. 3 corresponds to the top illustration of FIG. 2B. Most of the area of the portions of grooves 18' are overlapping with the mating seal face 22 of the mating ring. Thus, the grooves 18' tend to pump more gas into the seal gap at that section, and to increase the gas pressure in the seal gap at that section of the seal gap, as is shown by the pressure profile boundary 44 at the left of the arrows 40, which arrows 40 represent the force of the gas pressure in the seal gap.

As is known in the non-contacting mechanical face seal industry, the spiral grooves tend to pump fluid from the diameter exposed to the fluid toward the dam adjacent the other diameter. In this case, the spiral groove 18 pumps gas from the outside diameter inwardly until the pumped gas meets the annular dam 19 at the inner diameter of the interface. As the grooves pump the gas inwardly, the gas pressure at that radius increases to a maximum, indicated at point 45 of the boundary 44, because of the "back up" of fluid which develops at the dam 19. The longer the groove 18 extends into the interface, the more gas is available to pump and the higher the gas pressure which can be developed at that angular position of the seal interface.

Conversely, at the angular opposite end of the seal interface, represented at the lower end of FIG. 3 and at the bottom half of FIGS. 2A, 2B, the eccentricity of overlap, caused by the runout of shaft 12, permits a much smaller portion of grooves 18" to pump within the seal interface area. Thus, the pressure developed before reaching dam 19 is much smaller as is shown by the graph of boundary 46. As a result, the maximum gas pressure achieved at this portion, as shown by point 47, is much less than that developed at point 45. More importantly, the force due to the different pressures, represented in FIG. 2B by the areas between the seal face 22 and the pressure profile boundaries 44 and 46, respectively, are significantly different.

As a result of this pressure differential, a load imbalance ensues and the axial opening force acting on one angular side of the seal interface and thus on the seal face 16, is less than that acting on the other side. Thus, the pressure forces which maintain seal gap are not uniform across the seal interface, resulting in a skewed orientation of the primary ring seal face 22 relative to the seal face 16 of the mating ring.

Skewing of the primary ring seal face is not desirable and should be avoided for a variety of reasons. A non-uniform seal gap would be open much wider on one side of the seal interface, thereby providing a much larger leakage path for the sealed fluid. Another reason for which the parallelity of the seal faces is desirable is that a skewed primary ring seal face 22 would necessarily come much closer to the opposing face 16 of the mating ring at one section and further at the angularly opposite section. Coupled with the relative rotation of the seal rings. For the case of shaft runout, continually changing the dynamic orientation of all of the elements, thereby increasing the tendency for contact between the seal faces.

Figures 4A, 4B, 4C:
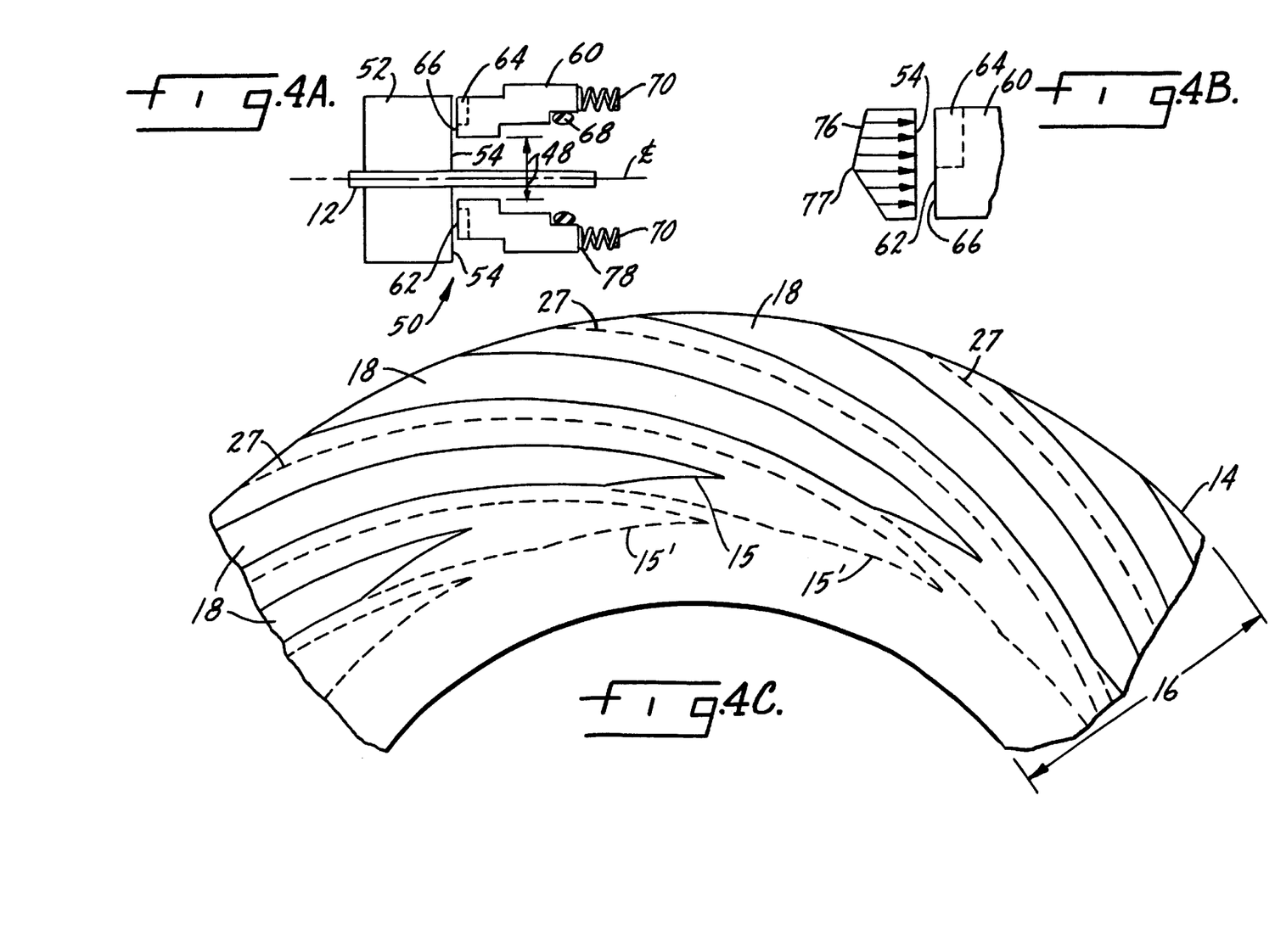
FIGS. 4A and 4B are schematic drawings of a seal made according to the present invention, indicating accommodation of large runout and the resulting equal loading pressure profile, respectively.
FIG. 4C illustrates, in a broken section, a conventional spiral groove pattern and in broken lines possible modifications thereto.

Seals made according to this invention, schematically illustrated in FIGS. 4A and 4B, accommodate a large degree of shaft runout or seal face non-concentricity while simultaneously maintaining seal face parallelity. The amount of possible shaft runout is represented by radial arrows 48. The schematic diagram shown in FIGS. 4A and 4B illustrate a seal 50 made according to the present invention also comprising a shaft 12 and a rotating mating ring 52 having a seal face 54. The seal face 54 in the seal 50, however, provides for a wider annular face than would normally be the case for a conventional seal, as will be described below.

The primary ring 60 is shown to present an essentially identical cross-section as that of primary ring 20, with certain significant differences. The seal face 62 includes spiral grooves 64 which in the seal illustrated, extend inwardly from the primary ring outer diameter toward an annular dam 66 disposed on the inner diameter of the primary ring seal face 62.

Referring again to FIG. 4A, the stationary primary ring 60 is sealed and attached to a housing (not shown) by means of a retainer (not shown). The seal between the housing (not shown) and the primary ring 60 is provided by a secondary seal means, such as O-ring 68. The O-rings 68 permit axial translation of the primary ring 60 relative to the housing. A biasing means, such as plural springs 70, bias the primary ring 60 so as to bring the seal faces 54, 62, into a mating sealing relationship, similarly to standard non-contacting mechanical end face seals.

The configuration schematically illustrated in FIG. 4A has an orientation of the primary ring 60 relative to the shaft 12 and centerline CL which is indicative of a high degree of seal face non-concentricity, as shown by the length of leader lines 48. The large outer diameter of the mating ring seal face 54 opposing the annular groove area of the primary ring seal face 52, as defined by the primary ring seal face outer diameter and the boundary line between the dam 66 and inner diameter terminal edges of the grooves 64, overlaps with the seal interface area throughout a full revolution of the shaft and rotating ring. That is, as long as the largest degree of seal runout does not displace the outer diameter of the primary ring seal face 52 radially outwardly of the outer diameter parameter of the mating ring seal face 54. Thus, the pressure profiles and axial load at all angular sections of the seal interface will be uniform around the full periphery of the seal interface, and uniformity of the pressure faces acting within the seal interface is maintained.

The uniform load condition is graphically illustrated in FIG. 4B. A gas pressure profile which is not dependent on the angular position or face concentricity, nor is affected by the degree of shaft runout, such as pressure profile boundary 76, is more likely to provide a uniform axial load. The pressure profile boundary 76 includes a "peak" pressure at point 77. Accordingly, the gap opening force, acting on any portion of the primary ring 60, and represented by the area between the pressure profile boundary 76 and seal face 54, is identical and uniform all around the seal interface. As long as the pressure acting on the same area of the back face 78 of the primary ring 60 is maintained at a uniform level, and the biasing force provided by the plural springs 70 is uniformly arranged to provide a uniform axial biasing force all around the primary ring back face 78, the seal rings will have a force configuration that maintains seal face parallelity. That condition will maintain the seal gap at a uniform dimension, maintaining sufficient fluid stiffness and thereby tending to avoid contact between seal faces 95,62.

The seal configuration illustrated in FIG. 4B, in which the mating ring rotates and the primary ring is stationary, is preferable to the alternative, as long as the mating ring seal face 54 is essentially perpendicular to the centerline CL.

Figure 4D:
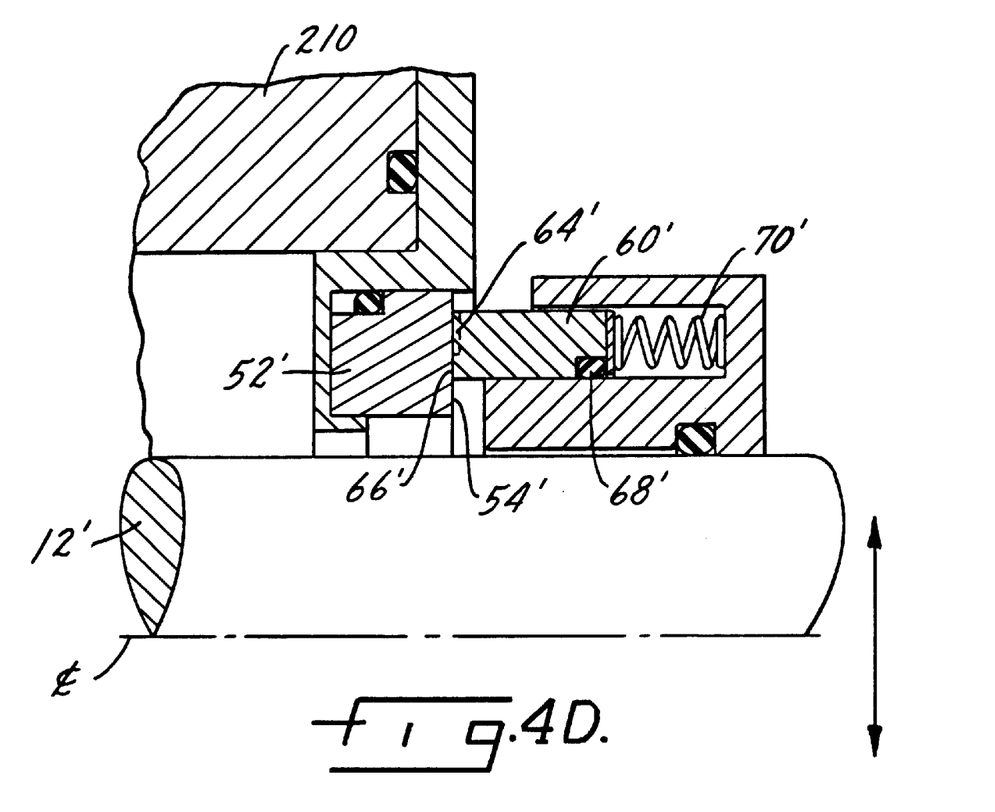
FIG. 4D illustrates in detailed cross-section an alternative embodiment of a seal according to the present invention.

The alternative configuration, as shown in FIG. 4D, is not preferred. A primary ring peak effect occurs in the cases of seal face eccentricity or excessive shaft runout, as shown by the arrows either of which may skew the seal ring faces 54', 66' relative to the seal interface. An exact perpendicularity between the mating ring face 54' relative to the shaft centerline CL is required to eliminate that effect. Such perpendicularity cannot be easily ensured in a seal application which has large shaft runout if the seal ring face 54' is stationary relative to the rotating shaft 12'.

The effect results from the change in the axial orientation of seal face of the rotating ring. If the primary ring rotates, and the mating ring is even slightly skewed from perpendicularity, at any instant of time, one angular portion of the primary ring will be axially forwardly displaced relative to a section at the opposite end. However, because of the shaft rotation, the axially forward angular section changes with the rotation of the shaft and primary ring. As the shaft is rotating, the force of the springs may not be compliant to continually push that section that is not at the "peak" into a parallel position. Thus, a larger overall seal gap will derive from the larger gap at the non-peak sections.

Additional considerations must be taken into account for providing sufficient lubricating gas stiffness for a seal application having a very slow shaft rotation. The amount of gas which is pumped between two seal faces depends to a great degree on the shaft rotational speed, and on the rotational speed of the attached ring, either the primary ring or the mating ring. Other parameters of the seal rings may be altered to maximize the amount of gas being pumped between the seal faces, both at start-up speeds and at very low rotational speeds.

An increased ability to maintain a seal gap at slower speeds depends to some degree on the amount of hydrostatic lift provided by the seal face, and especially by the grooved area of the seal face. That is, an the relative rotation of the seal faces decreases toward a minimum rotational speed which can still provide seal face lift off, necessarily more reliance is made on hydrostatic lift to provide the axial load for liftoff. Hydrostatic lift operates to provide load for liftoff both in static positions and in relatively rotating positions. Hydrostatic lift acts in non-contacting seals at slow speed operation during start up and shut down of the seal operation, when shaft rotation is minimal. As rotational speed increases, the amount of load provided hydrostatically diminishes in relation to the hydrodynamic load, to the point where hydrodynamic load makes the hydrostatic load negligible.

For operation of seals at very slow speeds, as contemplated by the present invention, the hydrodynamic load cannot become predominant because the grooves can pump only a limited amount of lubricating fluid, usually a gas, between the seal faces. For such slow speed seals, hydrostatic lift must be maximized. However, the operation of the grooves to provide at least some hydrodynamic lift by pumping lubricating fluid between the seal faces is necessary even during slow speed shaft rotation.

For this reason, it has been found necessary to provide seal face groove patterns which maximize the amount of area exposed to the pressure of the lubricating fluid in hydrostatic conditions. The amount of seal face area which is groove area depends on two parameters which are described below. These parameters are land-to-groove ratio and the ratio of groove radial "width" to dam width, also referred to as the dam width ratio. The area of the seal interface which is grooved can be maximized by decreasing the land-to-groove ratio and increasing the dam width ratio.

Referring now to FIG. 4C, a partial section of a conventional seal ring 14 and seal ring face 16 are illustrated having spiral grooves 18 extending partially across the face 16 to a terminal position between the inner and outer diameters at a circumferential arc 15. Dotted lines 27, indicating the lateral displacement of one of the spiral groove walls increases the land to groove ratio from one to about 3. Similarly, displacement of circumferential terminal wall 15 to a position closer to the inner diameter, as shown by the dotted line 15', further increases the area which is covered by the seal interface that is grooved. A substantial increase in the grooved area, as shown, will affect to some small degree the hydrodynamic lift provided by the rotating seal rings. However, the hydrodynamic lift effects are not considered to have as large an effect on lift as do the hydrostatic effects when the relative speed of rotation is slow. That is, at slow rotational speed, more lift is derived from hydrostatic effects, which are directly attributable to the grooved area within the seal interface, than from the hydrodynamic lift. This reliance on hydrostatic lift at slow rotation is even more pronounced when the pressure differential across the seal is greater, since more of the seal interface will be exposed to the higher pressure of the sealed fluid, since that fluid will seep between the seal faces by means of the groove.

It is evident from the illustration in FIG. 4C that decreasing the land to groove ratio and/or the dam width ratio, as shown, dramatically increases the grooved area of the seal interface, and thus increases the hydrostatic lift effects of the grooves. The ability to adjust the grooved area of a seal ring face provides the flexibility to change other parameters, such as the spring load provided by the springs, which would not be the case otherwise. The added flexibility to adjust the parameters to fit the sealing conditions is desirable, in that sealing of slow speed seals is necessary to a number of applications. Any one of the applications may impose certain restrictions on the seal ring parameters; however, with added flexibility to make appropriate alterations, the parameters which are not restricted by the application can be altered to take into account the restriction of other parameters. A number of embodiments follow, which are indicative of the various parameters which provide this flexibility.

Figure 5:
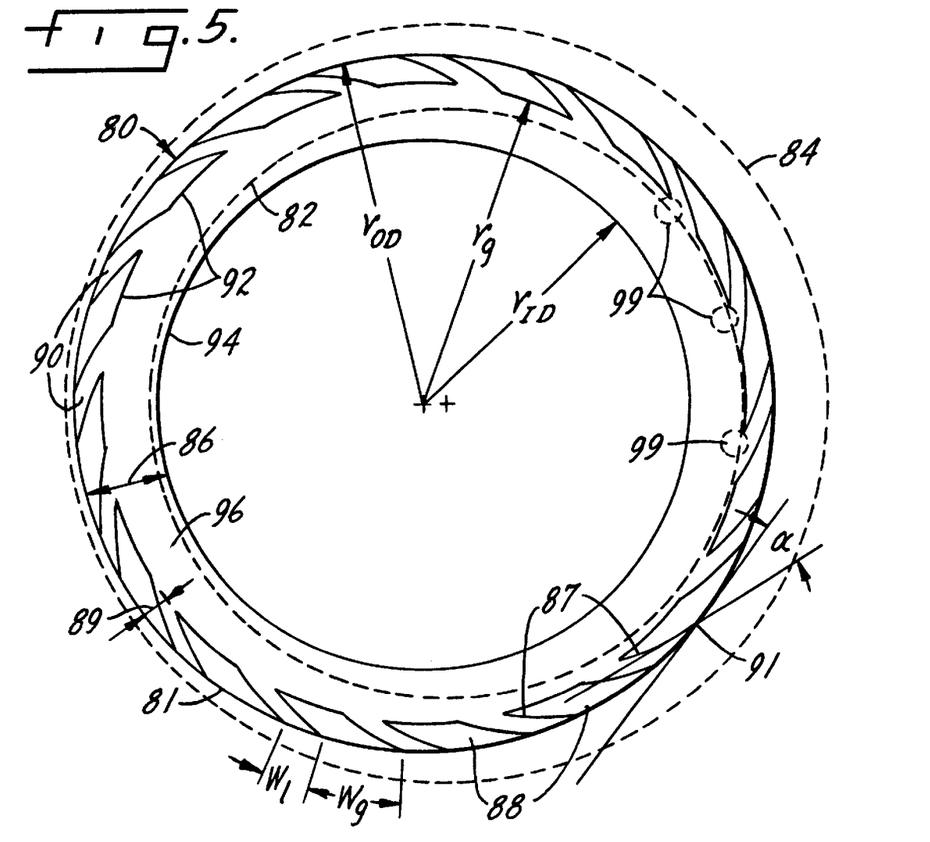
FIGS. 5–7 illustrate an inventive seal face pattern for a primary ring according to the present invention.

Referring now to FIG. 5, a groove pattern is illustrated on a primary ring 80 having an outer diameter circumferential edge 81. The primary ring groove pattern includes a number of features that are considered to provide sufficient and continuous lift off capability for even very slow rotational speeds used in specific applications, such as in mixers. Slow rotational speeds, as slow as 10 feet per minute, are possible in certain applications. Conventional seals have a minimum shaft speed of about 400 feet per minute or liftoff may not occur.

As described above, the seal interface area including the dam must be completely overlapping with the seal face of the opposing mating ring, shown by dotted lines 82,84 in FIG. 5. The seal interface is shown in exaggerated amount of shaft runout, to more easily illustrate the concept of overlapping all of the primary seal face area.

The primary ring includes a seal face 86 having a plurality of grooves 88. Each two adjacent grooves 88 are separated by a land 90. Together, the grooves 88 and interposed lands 90 define an annular area that is referred to as a groove area 89 extending radially between the circumferential edge 81 and groove terminations at circumferential segments 92. The grooves 88 terminate at these inner diameter segments 92 having a radius $r_g$, approximately halfway across the seal face 86. The radius $r_g$ defines one boundary of the groove area 89. The circumferential edge 81 of the primary ring 80 having a radius $r_{OD}$, defines the other boundary of the groove area 89. Seal face 86 is further defined by an inner diameter circumferential edge 94, having a radius $r_{ID}$, located at the inner diameter of seal face 86.

An annular ungrooved area, referred to as a dam 96, is disposed between the inner circumferential edge 94, having a radius $r_{ID}$, and the groove termination boundary 92 of the groove area 89, at radius $r_g$. Dam 96 acts as a radial stop or block for the gas being pumped by the grooves 88, and creates plural pressure areas 99. The pressure areas 99 represent the "peak" points of the pressure profile, such as point 77 of pressure profile line 76 (FIG. 4B).

The inner diameter of the seal interface, indicated by dotted line 82, must overlap the groove area 89 and the dam area and remain between the radius $r_{OD}$ and $r_{ID}$ during a complete shaft revolution. That is, for the maximum expected runout, the grooves should not open to the space inboard of the opposing seal face inner diameter 82.

It is important to the efficient operation of the inventive seals that all of the groove area 89, and of the dam 96, be within the interface area represented by the dotted lines 82,84. The representation of FIG. 5 is considered as the limit of degree of runout for a shaft. A large degree of runout would cause air to be pumped and injected through the gap without forming a pressure zone, which condition is undesirable since it would lead to imbalance of the seal.

Standards have developed for the seal face pattern parameters when the seal is used in high rotational speed applications; see, for example, aforementioned U.S. Pat. Nos. 4,212,475 or 4,768,790. The differences between the seal face patterns disclosed in the conventional seals and those of the inventive seal are a much lower land-to-groove ratio, and a more obtuse entrance angle α of the trailing groove wall at the outer circumferential edge 81. Additional embodiments may utilize all or some of the features of this configuration, or an embodiment may have additional features, or combinations or permutations of any of the features which are discussed below.

Seal face 86 indicates use of two seal parameter features which have been noted as providing lift off at slow rotational speeds. One parameter is the incident entrance angle α, which is defined by two tangent lines. The two tangent lines both are tangent at an intersection point 91 of the trailing groove side wall 87 of a groove 88 and of the circumferential edge 81 of seal face 86. The tangents of the lines taken at the intersection point 91 define angle α, and indicate the magnitude of the vane effect which is provided by the trailing side wall 87 of the groove 88. That is, the value of the angle α will determine the amount of fluid pumped into the seal gap by each groove 88, with larger angles providing more pumping effect if all other parameters are maintained. For standard seal face configurations, the angle α is normally in the range which is conventionally set at about 15°. Preferably, for lower rotational speeds, generally from about 10 feet per minute to about 400 ft./min., the angle α is in a range from about 16° to about 22°, and most preferably, it is approximately 19°.

Another parameter which aids in pumping of fluid at low rotational speeds is the land-to-groove ratio. Land-to-groove ratio is defined as a circumferential "width" of an arc which extends over a land relative to that of an arc which extends over a groove taken at the same radius. For a more detailed description of the definition of a land-to-groove ratio, reference is made to commonly assigned U.S. Pat. No. 5,071,141, the pertinent teachings of which are incorporated by reference herein.

For purposes of the present invention, a circumferential "width" of the land $w_1$ and a circumferential "width" of the groove $w_g$, both measured at the circumferential edge 81, may be used to obtain the ratio. For conventional gas seals, the ratio $w_1/w_g$ is about 1:1. The need to pump sufficient air between the seal faces to provide lift off is met by decreasing the land-to-groove ratio while maintaining an optimum groove width. This permits more than the standard number of grooves 88 in the same groove area 89 to be disposed on a seal face of the same diameter. For example, the standard number of grooves in the seal face 86 shown in FIG. 5 would be 12. However, providing a lower land-to-groove ratio, preferably in a range of from about 0.2 to about 0.8, i.e., 1:1.2 to 1:5.0, with the optimum value for the ratio embodiment in FIG. 5 preferably being about 0.5 (1:2). A lower land-to-groove ratio makes it possible to fit in additional grooves while maintaining the groove width $w_g$ constant, in the same groove area 89. The increased number of grooves pump more fluid between the seal faces, and thereby facilitate non-contacting sealing during slow speed rotation of the shaft 12. Alternatively, an optimum width of the land $w_g$ together with an optimized land to groove ratio, resulting in an optimized number of grooves.

Slower rotational speeds of a shaft produce conditions in a mechanical seal which approach hydrostatic sealing conditions. At slower rotational speeds, the seal conditions are in a transitional mode between hydrostatic and hydrodynamic conditions, such that both parameters should be considered as contributing to the seal characteristics. Accordingly, it is important to maximize both hydrostatic and hydrodynamic lift under conditions when both are required to maintain the seal gap. In many respects, however, changes in parameters to effectuate hydrodynamic lift are most likely to adversely effect hydrostatic lift and vice versa. The flexibility provided by the optimization process of the three parameters, land width, land to groove ratio and number of grooves, enables customization of a seal for industry specific applications.

Another parameter which may be utilized to increase hydrostatic lift is the total amount of groove area relative to the land area. Grooves which open to a higher pressure gas which have a lower pressure acting on the back faces of the seal rings permit a hydrostatic lift if the grooves are deep enough to permit the lubricating fluid to seep between the groove wall and the opposite seal faces so as to maintain the appropriate lift pressure. Moreover, because the axial load or lift force is a product of the amount of pressure exerted over a specific area, maximizing the groove area, relative to the land/dam area, is a feasible means of maximizing hydrostatic lift, as discussed above relative to FIG. 4C. Together with maximizing the number of grooves and land-to-groove ratio, to support a maximization of hydrodynamic lift, an optimization of other relevant parameters can provide a preferable configuration which is effective to maintain a stable seal gap, even for slow rotational speeds.

Other alterations of the seal face parameters may be utilized, whether alone or in combination with appropriate groove face characteristics that are described relative to the seal face 86 (FIG. 5). These parameters are further shown and described with reference to the seal faces illustrated in FIGS. 6–12, and are in accordance with the teachings of this invention for groove patterns which provide for lift-off at slow speeds.

Figure 6:
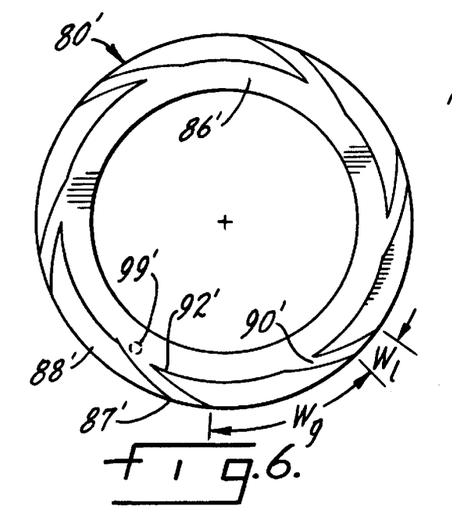

Referring now to FIG. 6, a modified land-to-groove ratio of 1:4 is illustrated where the size of the groove circumferential width $w_g$ is much larger angularly than for conventional grooves. Alternatively to the increase in number of grooves, increased areas which are defined by grooves 88', permit a greater amount of fluid to be pumped into each groove, which fluid is constricted by the converging edges 87', 92' of each groove. The advantages in the ability to maintain a uniform gap between the opposing seal faces derives from the greater amount of fluid pressure developed by each groove. The pressure profile is thought to have a peak pressure at a pressure zone 99, 99', indicated by dotted lines in FIGS. 5 and 6, respectively, disposed adjacent the terminal intersecting points of the converging edge 87, 92 and 87',92' of each groove 88,88', respectively.

Whereas the embodiment of seal face 86 shown in FIG. 5 relies on a greater number of pressure zones 99, the seal embodiment 80' (FIG. 6) has a seal face 86' with fewer pressure zones 99', but each having a greater peak pressure at zone 99'. Different sealing applications may rely on one or the other of those embodiments. Because of differences in the sealing environment, for example, in the viscosity or compressibility of the fluid being pumped, it may be more advantageous to use a specific land/groove ratio and a groove area having a specified number of grooves to achieve the desired uniformity in the seal gap. For example, an increase in overall groove area, as described above, can maximize hydrostatic lift, and thus provide an effective and stable gap maintaining mechanism.

Figure 7:
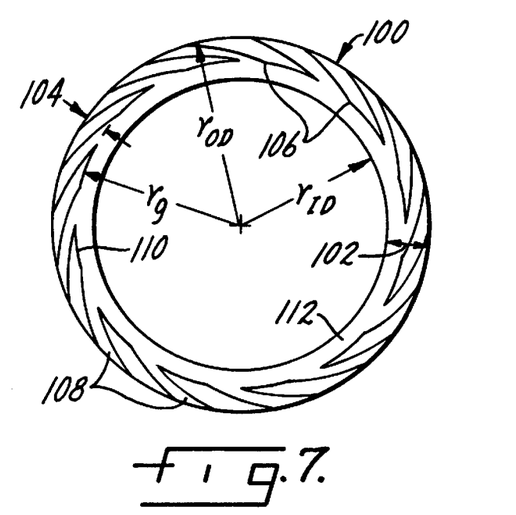

Other candidates for change in seal face parameters include changes in the groove length or depth of individual grooves or between circumferentially adjacent grooves. Referring now to FIG. 7, the length of the grooves, i.e., the radial width of the groove area, relative to the total radial width of the seal interface may be changed. FIG. 7 illustrates a seal ring 100 having a seal face 102. For purposes of this invention, it is considered that all of the annular seal face 102 will be opposed by the mating seal face of the mating ring (not shown in FIG. 7). A groove area 104, comprising circumferentially alternating spiral grooves 106 and lands 108, is defined by the circumferential inner diameter groove wall 110 at a radius $r_g$. The other boundary of the groove area 104 is the outer diameter circumference $r_{OD}$ of the seal face 102, so that groove area 104 is defined by the differences, $r_{OD}-r_g$.

Similarly, an ungrooved dam 112 is disposed at the inner diameter of seal face 102. It is defined by the boundary between the dam 112 and the groove area 104 at radius $r_g$ and by the inner diameter circumferential edge $r_{ID}$ of the seal face 102. The radial dam width is thus the difference between the two, namely, $r_g-r_{ID}$. For slow speed applications, it has been found that longer spiral grooves provide greater fluid pumping action and a more uniform seal gap. The ability to vary the length of the spiral grooves also becomes important in another feature of this invention, as will be explained below.

Figures 8, 9, 10, 11, 12, 14:
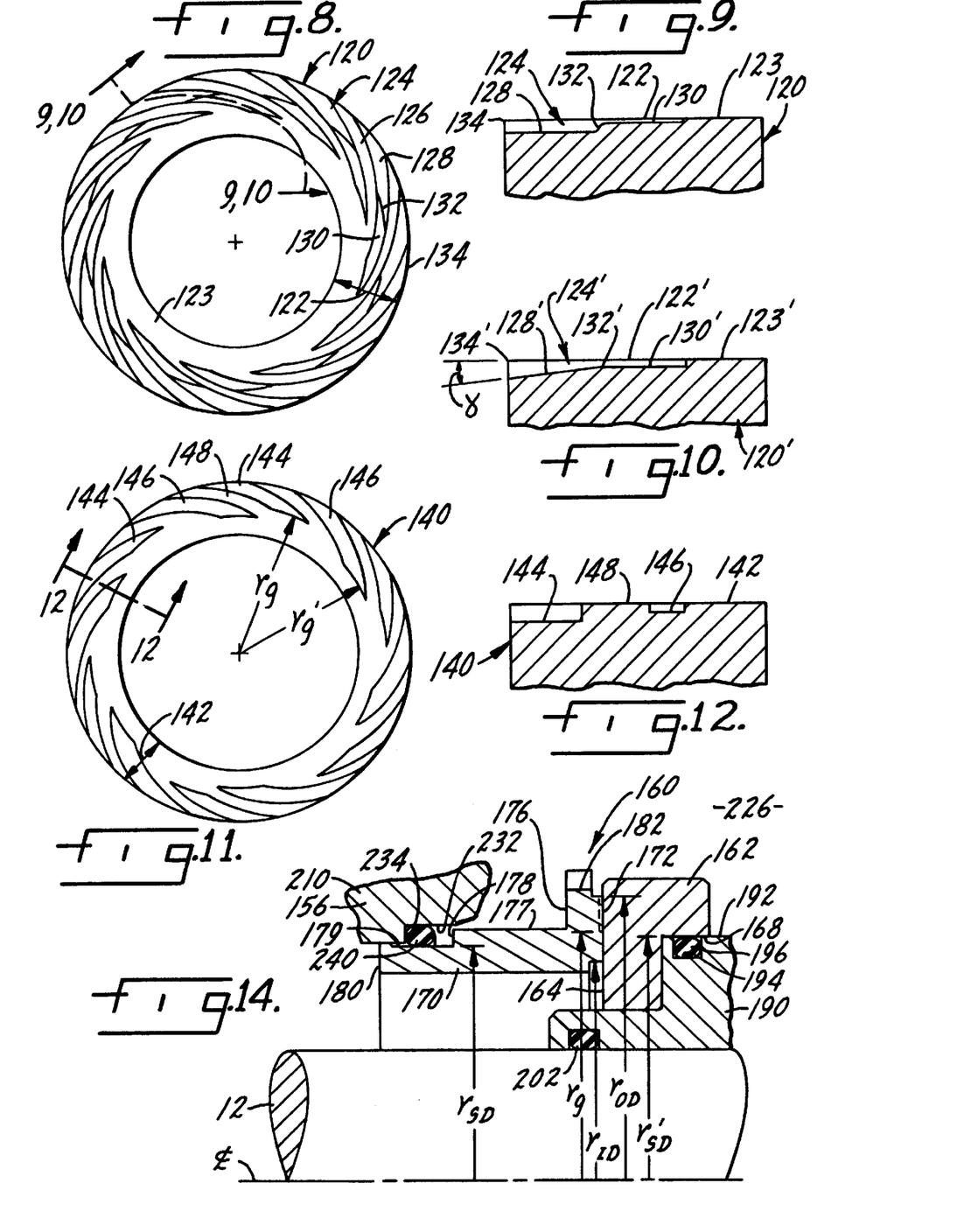
FIG. 8 illustrates yet another embodiment of a seal face pattern for a primary ring according to the present invention.
FIGS. 9 and 10 are cross-sectional views, taken approximately along cross-sectional line 9—9, 10—10 of FIG. 8, each showing a separate embodiment of a groove pattern profile according to the present invention.
FIG. 11 illustrates yet another embodiment of a seal face pattern for a primary ring according to the present invention.
FIG. 12 is a cross-sectional view taken approximately along a line 12—12 of FIG. 11, showing the groove pattern profile.
FIG. 14 shows in detail one of the seals according to the present invention, as shown in FIG. 13, indicating the relevant radii, from which the inventive seal parameters are developed.

Referring now to FIGS. 8, 9 and 10, two embodiments of the invention having variable depth grooves are shown, FIG. 9 being a cross-sectional view of one part of a seal ring 120, with the cross-section being taken approximately along the line 9—9, as shown in FIG. 8. FIG. 10 is an alternative embodiment of a seal face pattern taken at approximately the same cross-sectional line as that of FIG. 9. The top view of the seal face 122 is identical for either of the embodiments illustrated in cross-section in FIGS. 9 and 10.

Spiral grooves 124 having two sections each of different depths, relative to the seal face 122, are illustrated in FIGS. 8 and 9. Seal face 122 includes a dam 123 and plural grooves 124, adjacent ones of which are separated by lands 126. Each groove 124 comprises two groove sections, 128 and 130, being defined by a circumferential boundary transitional section 132 between them. The groove section 128 which is adjacent the circumferential edge 134 has a conventional depth for spiral grooves of the non-contacting type; that is, a depth relative to the adjacent lands 126 of about 300 microinches plus or minus 50 microinches. The shallow section 130 of groove 124, being disposed radially between the deeper section 128 and the dam 123, has a much shallower depth, on the order of about 20 to 40 percent of the deeper groove section 128. Appropriate depth for the shallower groove section 130 is in a range of between 50 to about 300 microinches, depending on the specific application, and preferably the depth is about 200 microinches, depending upon leakage. 50 microinches may be preferable for producing lower leakage.

The transitional portion 132 can comprise any of a number of forms, including an abrupt step, as is described in commonly assigned U.S. Pat. No. 5,722,665, or in the form of an angular tapered step 132, as is shown in FIG. 9. The angular tapered step 132 shown in the seal face pattern 122 indicates a gradual transition between the deep and shallow portions 128, 130, respectively, of the groove 124. However, the transition section need not be a gradual slope, but may take other forms, such as an abrupt step change, as described in aforementioned U.S. Pat. No. 5,722,665. An abrupt step is helpful in providing a partial dam at the transition, so that a pressure zone can develop dynamically at times when the shaft 12 is being rotated at full speed. The shallow groove portion 130 is thought to be effective during slower rotational speeds, such as during operation start-up or shutdown of the mixer, or during transitory periods of high runout, such as when additional material is being added to the mixer, thereby temporarily increasing the local viscosity of the products being mixed.

Referring now to FIG. 10, another embodiment of a variable depth groove 124' is shown in cross-section, taken approximately along the line 10—10 of FIG. 8, in which a shallow groove portion 130' is joined to a sloping groove portion 128' by a transition portion 132'. The transition portion 132' may be a simple angular shift in slope of the grooved portions relative to the surface 122' of the seal ring 120', as shown. Alternatively, the transitional portion may be a tapered angular step or even an abrupt step, as described above with reference to a seal ring 120 in FIG. 9.

The sloping of groove portion 128' may be gradual or more pronounced, depending on the conditions for which seal use is intended. The angle γ between the surface of groove portion 128' and the surface 124' of the seal ring face 122', indicating the slope of the sloping groove portion 128', is on the order of 2°–10°, and preferably is approximately 5°. That is, the depth of the shallow portion 130' may be about 100 microinches plus or minus 50 microinches, while the sloping groove portion 128' may be at about 400 microinches at the ring outer diameter edge 134', sloping to the intersection with the shallow groove portion 130' at the transitional section 132 at about 100 microinches. Alternatively, the sloping groove section may approach a depth of about 200–300 microinches with a transitional section (not shown in FIG. 10) taking the form of either an abrupt step or tapered angle step to decrease the depth of the shallow groove section 130'.

An alternative seal face groove pattern (not shown) may include a double tapered groove. The groove depth adjacent the circumferential edge starts out deeper, e.g., about 300 microinches and tapers to slightly less depth, about 250–275 microinches, and then tapers much more sharply to a depth of about 50 microinches adjacent the dam. Other combinations of depths and tapers are possible, and may be found through testing to provide effective sealing and lift-off characteristics at slow rotational speeds.

Referring now to FIGS. 11 and 12, yet another feature is shown which may be used in a slow speed seal, either alone or in combination with one or more of the features described above. Mating seal ring 140 illustrated in FIGS. 11 and 12 has two types of different grooves alternating circumferentially around the periphery of the seal face 142. A first type of deep groove 144 is shown with a conventional groove shape, depth and radius of the groove termination ($r_g$). However, every other alternating groove is a shallow groove 146 having a much shallower depth relative to the seal face 142. The groove termination radius ($r_g'$) of the shallow grooves 146 may be the same as that of the deep grooves 144, or may be longer, as shown.

Adjacent alternating grooves 144,146 are separated by a land 148, and in accordance with the use of one or more different features in combination, the land-to-groove ratio may be on the order of 1:2, as shown. Another feature, discussed above with reference to seal ring 100 in FIG. 7, is the increased length of the shallow grooves 146, which have a different $r_g$ than the deeper grooves 144. Different groove depths in combination with different groove lengths ($r_g, r_g'$) for alternating grooves appear particularly suited to reduce excessive leakage of the fluid being pumped while simultaneously providing adequate lift-off characteristics at slower speeds.

The cross-sectional view drawn in FIG. 12 is a cross-section taken approximately along a line 12—12 through the seal ring 140 of FIG. 11. The depths of the shallow groove 146 relative to the deeper groove 144 are exaggerated for purposes of illustration. The actual depths of the shallow groove 146 are preferably about 150 microinches and of the deeper groove 144 about 300 microinches within the tolerance range described above. These depths must be exaggerated in the drawing figures, otherwise the scale of the drawings in FIGS. 9, 10 and 12 would not render the groove depths visible.

The individual seal parameters shown in FIGS. 5–12, and described above, illustrate features which have been identified for use on a mating ring of mechanical seals. Additional seal face groove pattern configurations for providing lift off at slow speeds are described in commonly assigned U.S. Pat. No. 5,496,047, the teaching of which is incorporated by reference herein. However, this invention utilizes some or all of these features on the primary ring of a seal, whether used individually or in combination with each other. The grooves are disposed on the axially movable primary ring and on a seal having a mating ring with a wide opposing seal face, as described above, for providing a more effective seal in slow speed applications where, additionally, excessive shaft runout is problematic.

Figure 13:
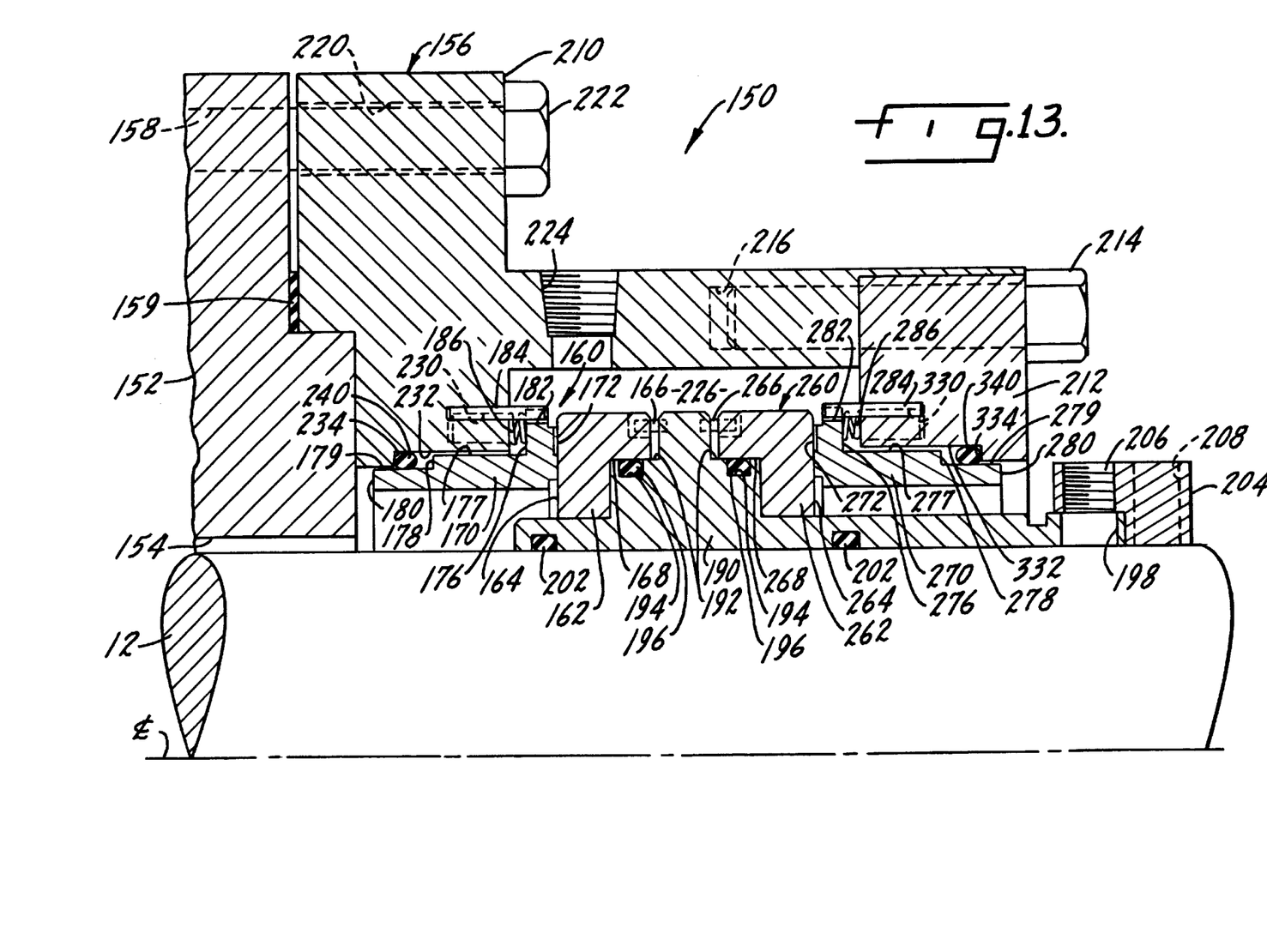
FIG. 13 shows in cross-section a dual seal arrangement utilizing seals made according to the present invention.

Another application for the types of seals described above is in a dual seal arrangement 150 for a slow speed application, such as in a mixer, as is illustrated in FIGS. 13 and 14. The seal arrangement 150 may be disposed vertically in actual use, but by convention is shown in a horizontal position in the drawing FIGS. 13,14.

A shaft 12, much longer than the broken portion shown in FIG. 13, extends through an aperture 154 in a mixer housing 152. The shaft 12 is connected to one or more large mixing vanes (not shown) along one axial extremity of the shaft, extending toward the left as shown in FIG. 13, and to a drive mechanism, such as a large mixer motor (not shown) at the opposite extremity of the shaft, extending toward the right of drawing FIG. 13.

One or more bearings (not shown) may be interposed between the seal arrangement 150 and the motor. Since both a motor and bearings are normally lubricated by oil, vertical installation requires a seal, such as a lip seal (not shown), between the aperture 154 and the motor to avoid oil, or any other contaminants, from entering the seal arrangement 150, and thus into the mixing chamber within the housing 154. Contamination must be especially avoided for mixed products that are sensitive to such contamination, such as drug or food products. It is considered advisable to utilize a dual seal arrangement, as shown in FIG. 13, in such applications to ensure product purity.

The seal arrangement 150 is necessary to maintain the pressure within the tank or chamber being sealed. A double seal arrangement is preferred to restrain entry of contaminants from the atmosphere side into the tank.

Seal arrangement 150 provides a seal for shaft 12 as it extends into a mixer housing 152 through a bore 154 therein. Seal arrangement 150 comprises a gland plate 156 containing two mechanical face seals 160,260. The mixer housing 152 includes a plurality of threaded bores 158 for attaching a seal gland plate 156 to the mixer wall 152. Each seal 160,260 comprises a number of elements that have corresponding elements in the other seal, albeit oriented in opposite directions. For example, mating rings 162,262, each have a mating ring seal face 164,264. However, the seal face 164 faces toward the housing 152 while seal face 264 faces in the opposite direction away from the housing 152. Similarly, the back faces 166,266 are oppositely oriented in a back-to-back orientation relative to each other. Radially extending back faces 166,266 include a cylindrical inner wall 168,268 for sealingly mounting the mating rings 162, 262 and an appropriate indent for insertion of a conventional drive mechanism.

The opposing primary rings 170,270 include radially extending seal faces 172,272 which provide for an opposing mating relationship with the opposing faces 164,264 of the mating rings 162,262. As described above with reference to FIG. 5, the mating ring seal faces 164,264 are much wider than the corresponding seal faces 172,272 of the primary rings 170,270. As described above with reference to FIGS. 1–12, the primary rings 170,270 also include radially extending back face sections which are stepped, including outer diameter sections 176,276, joined to secondary seal radial walls 178,278 by a cylindrical surface 177,277, respectively. Secondary seal radial walls 178,278 are in turn joined to inner diameter sections 180,280 by cylindrical surfaces 179,279. Each of these sections presents a radially extending surface which is exposed to the pressure of the fluid with which it is in contact, which fluid pressure exerts an axial thrust force on the radially extending back faces of each ring.

The outer diameter section further includes one or more drive dents 182,282 in which corresponding pins 184,284 maintain the rotational position of the primary rings 170,270 relative to the corresponding portion of the gland plate 156. The back face faces 176,276 provide load bearing surfaces for a biasing means, such as springs 186,286, one each of which is disposed in a corresponding bore in the gland plate 156. The springs provide an equal axial bias against the primary rings 170,270 to keep the corresponding pairs of seal faces 164, 172 and 264,272 in an opposing mating relationship with each other. The axial load on the primary ring exerted by the biasing means is an important consideration of this invention, as will be described below.

Mating rings 162,262 are axially disposed along the shaft 12 and are each mounted on a shaft sleeve 190 which rotates with the shaft. The shaft sleeve has a structure and dimensions appropriate to accept back-to-back mounting of the mating seal rings 162,262. Two cylindrical outer walls 192, having diameters slightly smaller than the diameters of the mating ring inner walls 168,268, include annular grooves 194 about which O-rings 196 are disposed. The O-rings 196 sealingly engage the inner cylindrical walls 168,268 of the mating rings 162,262 to the sleeve 190 without any clamping of the mating ring 160,260. O-rings 196 define a sealing diameter $r'_{SD}$ for the secondary seal of the mating rings 162,262, as shown in FIG. 14.

An appropriate drive means, such as pins, are inserted into appropriate bores in the shaft sleeve 190, as shown in a conventional manner. The other ends of the pins are inserted into indents disposed in the mating rings 162,262. The mechanism provides rotational drive to the mating rings when the shaft 12 and sleeve 190 are rotating, thus causing corresponding rotation of the mating rings 160,260.

Shaft sleeve 190 is also sealingly engaged by means of O-rings 202 to the shaft 12 and by virtue of the shaft sleeve inner cylindrical wall having slightly larger diameter to the shaft diameter, a seal is provided between the shaft 12 and the shaft sleeve 190. A drive mechanism, disposed at the outboard end of the seal arrangement 150, external to the gland plate 156, provides a means for connecting the shaft sleeve 190 to the shaft 12 for rotation therewith. The shaft sleeve 190 includes drive bores 198 for engaging a shaft sleeve drive. The drive mechanism may comprise a shaft collar 204 having apertures 206,208 for receiving set screws (not shown) to attach both the shaft collar 204 and the shaft sleeve 190 to the shaft 12. The threaded bores 206 are disposed and oriented to match the corresponding bores 198 in the shaft sleeve 190 external to the gland plate 156. For a discussion of an appropriate attachment means of the shaft means by a shaft collar, reference is made to commonly assigned U.S. Pat. No. 5,468,002, which is incorporated by reference herein.

Seal arrangement 150 is intended for installation as a cartridge, comprising a gland plate 156 upon which all the other seal elements are mounted. During installation, appropriate cleaning of the outer wall of the mixer housing 152 provides a surface for a static seal between the gland plate 156 and the housing 152. Appropriate adjustments and/or shims may be provided to match the corresponding wall surfaces, such as a gasket 159.

Proper assembly in the cartridge within the gland plate 156 permits mounting over one end of the shaft 12. The assembly can then slide along the shaft until the seal is effected between the walls of gland plate 156 and the mixer housing 152 by the gasket 159.

Gland plate 156 can comprise a plurality of assembled sections, but is shown in FIG. 13 with only two sections, a housing section 210, and a seal enclosing section 212. Following assembly of the seal arrangement 150, the sections 210,212 are joined to each other by plural bolts 214 extending into and engaging appropriate threaded bores 216 disposed in the housing section 210. Joining the two gland plate sections 210,212 locks all of the seal elements in the enclosure defined by the shaft 12 and gland plate 156, and permits the seal arrangement 150 to be shipped as a cartridge for efficient installation around a shaft 12.

The housing section 210 further includes plural bores 220 through which bolts 222 are inserted, as shown in phantom. Bolts 222 engage corresponding threaded bores 158 in the housing 152, attaching the gland plate 156 to the mixer housing wall 152. A gasket or other elastomeric member, such as annular gasket 159, is inserted between the housing 152 and the gland plate housing section 210 to provide a sealing connection therebetween. A barrier fluid connection, such as a threaded tapered bore 224, provides a means for introducing a pressurized buffer fluid into the enclosed intermediate barrier chamber 226 defined by the gland plate 156 and the outer diameter of the two axially disposed seals 160,260, in accordance with the teachings of aforementioned U.S. Pat. No. 5,375,853.

Both sections 210 and 212 of the gland plate 156 provide means for mounting of the respective primary rings 170,270 and sealing the back faces thereagainst. Each section 210, 212 includes a like construction, but is shown in mirror image having appropriate construction, and includes appropriate shape and dimensions for matching the seal ring back wall structure. The construction providing for mounting of the primary seal rings comprises a series of bores, such as plural axial cylindrical bores 230,330 for insertion of the springs 186,286. Annular apertures, defined by cylindrical surfaces 232,332, have a diameter slightly larger than the corresponding outer diameter surfaces 177,277 of the intermediate section adjacent the cylindrical surfaces 178,278 of primary rings 170,270. Surfaces 232,332 are disposed radially inwardly from axial bores 230,330, respectively. The bore aperture cylindrical surfaces 232,332 terminate at a radial wall 234,334 extending radially inwardly toward the centerline CL.

Cylindrical bore surfaces 232,332 and radial walls 234, 334, respectively, of sections 210,212, respectively, together with the inner diameter section cylindrical surface 179,279 and radial walls 178,278 of the primary rings 170,270, define annular cavities which contain O-rings 240. Each cavity is axially somewhat longer than the axial dimension of the O-rings 240,340, allowing some axial travel in the O-rings. O-rings 240,340 have a thickness slightly larger than the radial dimension of the annular cavity between the respective surfaces 230,330 and 179,279, thereby providing a secondary seal therebetween. The axial length of the cavity can provide a double balance of the seals, depending on which side of the O-ring 240,340 the pressure is higher. This is an important feature of this invention, as will be described below.

The diameter, or, more appropriately, the sealing diameter of the O-rings 196,296 and 240,340 determines the axial load on the corresponding rings. Judicious placement of the O-ring sealing diameters provides for a greater efficiency in sealing, and provides for a longer lasting seal which need not be replaced as often. The process of replacing a seal in a mixer can be a lengthy and costly one, and may result in down time of the mixer of one to two days. Thus, avoiding unnecessary seal replacement procedures is highly beneficial, because a mixer which is out of commission may force shutting down of a whole production line. The longer mean times between seal replacement result in substantial monetary savings due to avoiding an idle production line, and alleviates time pressures which may result in missed deadlines for product shipments.

A fluid lubricated seal, such as seal arrangement 150 shown in FIG. 13, provides for non-contacting, non-contaminating sealing of a mixer. The problems encountered in mixer applications, such as excessive shaft runout and slow speed of rotation of the shaft 12 tend to cause faster than normal wear of the seal rings for two reasons. Shaft runout causes uneven film pressures in the seal gap, causing tilting of one seal ring relative to the other, and leading to undesirable contact of the seal faces. Similarly, insufficient fluid film pressures in the seal gap, resulting from insufficient pumping of lubricating fluid by the grooves, also results in undesirable contact. These problems are both addressed and are overcome by the design of the inventive seal construction.

The total axial load acting on the primary ring results from the spring forces of springs 186,286 and from fluid pressures, both the pressure developed by the pumping grooves and from the barrier fluid and the process fluid. The total axial load on the primary ring has sufficient force to close the seal when the shaft is not rotating and the fluid pressures tend to close the gap. However, the total load is minimized so as to open upon a minimal amount of barrier fluid being pumped by the grooves into the seal gap, the grooves having structures in accordance with the seal groove patterns described above.

Referring now to FIG. 14, a detailed view of a single seal, whether 160 or 260, according to the present invention is shown with only the necessary parts to illustrate the inventive feature described below. All parts shown in FIG. 14 are shown in cross-section with regard to one seal 160, but are equally applicable, if not more applicable, to the other seal 260 shown in FIG. 13. Because of the pressure differential across the second seal 260, due to the pressurization of the barrier gas in intermediate chamber 226, axial thrust force FIG. 14 as a radius $r_g$ extending to the inner diameter termination of the spiral groove (shown in phantom). Similarly, the seal interface is defined by the inner diameter $r_{ID}$ and outer diameter $r_{OD}$ of the primary ring seal face 172.

Another important dimension parameter to be considered in obtaining the benefits and advantages of the present invention is the sealing diameter of the O-ring 240, $r_{SD}$. When pressurized, the intermediate chamber 226 normally would contain a barrier gas, such as nitrogen, at a pressure greater than the pressure of the fluid within the mixer housing 152 (FIG. 13). Nitrogen gas is relatively inert and normally would not react with the mixer ingredients, so that pumping of nitrogen into the mixer will not harm the contents. The greater pressure of the nitrogen barrier gas will normally exert an axial thrust force on the O-ring 240, pushing it against the radial wall 234 of the gland plate section 210 (FIG. 13), as shown. Thus, the sealing diameter is at the cylindrical surface 179 of the O-ring 240, as shown by the radius $r_{SD}$ extending from the centerline CL to the surface 179.

The dimensions of the seal face parameters are important in defining two relationships which determine the fluid pressure forces acting on the primary rings 160,260. Appropriate choice of dimensions, groove shapes and pressure profiles provides for the optimal configurations to accommodate both slow speed rotation and shaft runouts, which will permit use of the inventive seals in mixers and other slow speed applications.

The three relevant relationships are referred to herein as groove balance, dam width ratio and overall seal balance, and roughly relate the areas at the back faces of the primary ring 170, that is, areas of radial walls 176,178 relative to the area of the annular grooved portion of the primary ring seal face. Specific relationships are defined by the following equations, where the variables are defined above.

|  | For grooves open to the outer peripheral edge | For grooves open to the inner peripheral edge |
|---|---|---|
| (1) Dam width ratio = | $\dfrac{r_g - r_{ID}}{r_{OD} - r_{ID}}$ | $\dfrac{r_{OD} - r_g}{r_{OD} - r_{ID}}$ |
| (2) Groove balance = | $\dfrac{r_g^2 - r_{SD}^2}{r_g^2 - r_{ID}^2}$ | $\dfrac{r_g^2 - r_{SD}^2}{r_g^2 - r_{OD}^2}$ |
| (3) Seal balance = | $\dfrac{r_{OD}^2 - r_{SD}^2}{r_{OD}^2 - r_{ID}^2}$ | $\dfrac{r_{SD}^2 - r_{ID}^2}{r_{OD}^2 - r_{ID}^2}$ | equalization may be more appropriate. An increase in fluid pressure acting on the back faces of the seal rings 162,262 causes small differences in the radii of different seal parameters to magnify the resulting effect on axial thrust force. Although the same considerations are applicable for seal 160, because of the much smaller pressure differential, inattention to seal pressure boundaries, resulting in variation of the axial thrust forces, does not tend toward causing seal gap upset as readily as it does in the outboard seal 260.

Detail of seal 160 shown in FIG. 14 includes a gland plate 156 against which primary ring 170 is sealed by an elastomeric O-ring 240. For purposes of discussion of seal ring face 172, the groove pattern illustrated in primary seal ring 80 of FIG. 5 can be utilized to cross reference the dimensions and radii which are described below. For example, the boundary 92 at the groove terminal radius $r_g$ is shown in Conventionally, the value for dam width ratio is described as being on the order of from approximately 0.5 to 0.8, for the groove balance of about 0.86 and for seal balance, typically between 0.8 and 0.9. The conventional parameters for these critical parameters are insufficient to maintain a seal gap during slow speed rotation of the shaft.

Some flexibility is inherent in choosing the values of these parameters for slow speed applications. It is important that all three of the parameters be within the prescribed ranges for use in slow speed applications, and all three parameters may be required to be at optimum values for specific slow speed applications. The preferred values which are considered optimal for slow speed applications, such as for mixers, are between about 0.2 and about 0.5 for the dam width ratio, between about 0.75 and about 0.85 for groove balance and about 0.80 to about 0.82 for the seal balance. One optimal set of values for these parameters in a specific application has been found to be 0.3 for the dam width ratio, about 0.3 for groove balance and about 0.8 for seal balance. In dual seal arrangements which seal a process fluid at higher pressures, the parameters for the inboard seal and the outboard seal may be different, i.e., the inboard seal may have a groove balance of 0.3 and a seal balance of 0.78, whereas the outboard seal may require these parameters to have values of 0.45 and 0.81, respectively, while all other elements of the seals otherwise may be the same. Of course, the optimal values for these and other parameters may be different, albeit within the specified ranges, for different specific applications, depending on the specific sealing conditions.

It is an important consideration and inventive feature of both the single seal embodiment, and for the dual seal embodiment shown in FIGS. 13 and 14, that the sealing diameters of the secondary seals of the O-rings 196,240, 340 are substantially similar, so that the axial thrust forces generated by the fluid pressure, acting on the back faces of the respective seal rings 162,170 and 262,270, essentially counteract each other. This is important in minimizing the axial load on the seal rings, and on the seal faces 164,172, 264,272, regardless of whether the fluid is at a higher pressure in chamber 226 or within the housing 152. The concept of axial thrust load minimization is more fully developed in the aforementioned U.S. Pat. No. 5,375,853, and further reference to that patent is recommended for a fuller explanation.

This invention may further be utilized together with other inventions and adaptations, thereby permitting use in applications which have not heretofore been possible. For example, in specific applications having low shaft rotational speed, a high degree of shaft runout, and very high pressures, the teachings of the present invention may be utilized in conjunction with the teaching of U.S. Pat. No. 5,681,047, which teachings are incorporated herein by reference. A primary seal ring with spiral grooves opposed to a large diameter mating sealing face, as taught herein, may further include an annular cutout in the seal ring body immediately behind the seal face, in order to provide flexibility to the seal face portion of the primary ring, thereby accommodating high fluid pressures from, for example, the outer diameter periphery. Grooves are known to be disposed on standard primary rings, including on silicon carbide, tungsten carbide or carbon rings. Grooves disposed on a primary ring have been disclosed, for example, in U.S. Pat. Nos. 2,623,357 or 5,201,531. However, none of the known uses or descriptions also includes the additional features described herein which provide to the inventive seals the capability to accommodate large shaft runout and/or very slow shaft rotation speeds. Moreover, none of the known instances which describe grooves disposed on the primary ring describes or even appreciates the efficacy of such an arrangement in accommodating a high degree of shaft runout.

The inventive concepts of the development described herein can be applied to most presently used seal ring materials. For example, both the primary and mating rings may comprise silicon or tungsten carbides, in which case the spiral grooves may be formed or etched on the primary seal ring surface in a conventional manner. In addition to these materials, however, it has been found that because of the lift-off characteristics provided by the seal ring face patterns, and the increased seal load stability provided by the wide mating ring face, it has become possible to utilize the inventive concepts to provide the spiral grooves on a conventional "soft" carbon material. Heretofore, the rubbing contact between the seal ring sealing faces tended to scratch and wear down the softer material. Spiral grooves on a softer carbon surface were impractical because these would wear off after a period of use due to the seal face contact. Effective lift off of the seal primary ring tends to avoid contact between the seal faces and enables groove formation on the conventional "soft" carbon primary seal rings.

Other modifications and minor changes may become apparent to a person of ordinary skill in the art once an understanding of the inventive concept described herein is had. Accordingly, this invention is not limited by the illustrated embodiments shown and described herein, but is limited only by the following claims.

What is claimed is:

1. A gap type mechanical end face seal for providing fluid sealing between a housing and a rotatable shaft extending through a bore in the housing, the seal having an annular primary ring and a relatively rotating annular mating ring, each said ring being annularly symmetrical about a centerline and each having a seal face in opposed mating sealing relation to the seal face of the other ring, an inner diameter peripheral edge and an outer diameter peripheral edge, one peripheral edge of said annular rings being configured for contact with pressurized fluid to be sealed within the housing and the other peripheral edge being configured to be exposed to and in contact with a gaseous environment outboard of said seal, upon installation, said primary ring being axially movable relative to the shaft or housing and said axially movable primary ring being sealed to either the shaft or housing by a primary ring secondary seal, said mechanical end face seal further comprising a biasing means for biasing said axially movable primary ring tending to bring said opposed mating seal faces toward contact with each other, said seal face of said axially movable primary ring further including a plurality of grooves extending partially across the face from the peripheral edge exposed to the gaseous environment outboard of said seal and toward the peripheral edge exposed to the pressurized fluid, each of said plural grooves terminating intermediate said peripheral edges at a circumferential terminal segment to define an annular groove area adjacent said peripheral edge exposed to the gaseous environment outboard the seal and an ungrooved dam adjacent said peripheral edge exposed to the pressurized fluid, the radial width of the seal face of the axially movable primary ring being substantially less than the radial width of the seal face of said mating ring, such that during seal operation, the seal face of said mating ring at all times overlaps the annular groove area of the axially movable primary ring in an opposing mating relation, and rotation of one of said rings relative to the other causes said grooves to pump a gas from the gaseous environment adjacent the peripheral edge to which said grooves open toward said dam, said grooves pumping gas between said seal ring faces and thereby causing a fluid film gap to form between said seal ring faces, so as to provide a leak-tight seal preventing fluids leaking along said shaft and through said bore from said housing and into the gaseous environment outboard said seal.

2. The gap type mechanical end face seal according to claim 1 wherein each of said grooves on said seal face of said axially movable primary ring terminate at said circumferential terminal segment disposed at a radius to define said annular groove area having an equal or greater radial width than the area of said ungrooved dam.

3. The gap type mechanical end face seal according to claim 1 wherein said seal face of said axially movable primary ring further includes grooves that each terminate at said circumferential terminal segment, the terminal segments of said grooves defining said dam and a dam width ratio according to the following equations:

$$\text{Dam width ratio} = \frac{r_g - r_{ID}}{r_{OD} - r_{ID}} \quad \text{For grooves open to said outer diameter peripheral edge} \quad (1)$$

$$\text{Dam width ratio} = \frac{r_{OD} - r_g}{r_{OD} - r_{ID}} \quad \text{For a groove open to said inner diameter peripheral edge} \quad (2)$$

where $r_{OD}$ is the radius from the centerline to said seal face outer diameter peripheral edge;

$r_{ID}$ is the radius from the centerline to said seal face inner diameter peripheral edge;

$r_g$ is the radius from the centerline to the circumferential terminal segment of the seal ring grooves; and where the dam width ratio is in the range of from 0.2 to about 0.9.

4. The gap type mechanical end face seal according to claim 3 wherein said annular groove area for said seal face of said axially movable primary ring further defines said dam width ratio having a value of approximately 0.3.

5. The gap type mechanical end face seal according to claim 1 wherein said grooves further comprise a taper such that the groove depth slopes toward the surface of the primary ring seal face as successively measured in a direction away from the circumferential peripheral edge to which the grooves open.

6. The gap type mechanical end face seal according to claim 5 wherein said groove depth taper is from about 300 microinches deep at the peripheral edge to which the grooves open to about 100 microinches deep adjacent the circumferential terminal segments defining said dam.

7. The gap type mechanical end face seal according to claim 1 wherein said seal face of said axially movable ring further comprises lands between adjacent grooves, said lands and said grooves having widths defining a land to groove ratio according to the equation $w_1/w_g$, where $w_1$ is a circumferential segment over the land measured at the outer diameter peripheral edge of said axially movable ring and $w_g$ is a circumferential segment over the grooves taken at the outer diameter peripheral edge of said axially movable ring; and the land to groove ratio is in a range of between about 0.2 to about 0.9.

8. The gap type mechanical end face seal according to claim 1 wherein said seal face of said axially movable primary ring further comprises lands between said grooves, said grooves including at least two distinct groove portions at different depths relative to the lands of the primary ring seal face and having a transitional portion between the groove portions having different depths.

9. The gap type mechanical end face seal according to claim 8 wherein said transitional portion between said distinct groove portions further comprises an abrupt step-like change in depth from the depth of one groove portion to the depth of another groove portion.

10. The gap type mechanical end face seal according to claim 9 wherein said seal face of said axially movable primary ring is defined by an essentially planar surface and at least one of said groove portions includes a taper such that the groove depth of said at least one of said portions slopes toward the surface of the seal face as successively measured in a direction away from the peripheral edge to which the grooves open.

11. The gap type mechanical end face seal according to claim 8 wherein said transitional portion between said distinct groove portions further comprises an angular tapered step between groove portions having said different depths.

12. The gap type mechanical end face seal according to claim 11 wherein said seal face of said axially movable ring is defined by an essentially planar surface and at least one of said groove portions includes a taper such that the groove depth of said at least one of said portions slopes toward the surface of the seal face as successively measured in a direction away from the peripheral edge to which the grooves open.

13. A gap type mechanical end face seal according to claim 11 wherein at least one of said groove portions includes a taper, and said taper is from about 300 microinches deep at the peripheral edge to which the grooves open to about 100 microinches deep immediately adjacent the circumferential terminal segments defining said dam.

14. The gap type mechanical end face seal according to claim 8 wherein said seal face of said axially movable primary ring is defined by an essentially planar surface and at least one of said groove portions includes a taper such that the groove depth of at least one of said portions slopes toward the surface of the seal face as successively measured in a direction away from the peripheral edge to which the grooves open.

15. The gap type mechanical end face seal according to claim 1 further including a mating ring secondary seal associated with a radial face of said mating ring removed from said mating ring seal face, said primary and mating ring secondary seals each defining a sealing diameter, said sealing diameter of said primary ring secondary seal being essentially identical to said sealing diameter of said mating secondary seal ring.

16. The gap type mechanical end face seal according to claim 1 wherein said sealing diameter of said axially movable primary ring further comprises a sealing diameter defining a groove balance relationship between the sealing diameter of the primary ring secondary seal, $r_{SD}$, and the radial width of the groove area, according to following equations:

$$\text{Groove Balance} = \frac{r_g^2 - r_{SD}^2}{r_g^2 - r_{ID}^2} \quad \text{for a groove open to the outer diameter peripheral edge;} \quad (1)$$

$$\text{Groove Balance} = \frac{r_g^2 - r_{SD}^2}{r_g^2 - r_{OD}^2} \quad \text{for a groove open to the inner diameter peripheral edge; and} \quad (2)$$

where $r_{SD}$ is the radius from the centerline to the sealing diameter of the first secondary seal, $r_{ID}$ is the radius from the centerline to the seal face inner diameter peripheral edge;

$r_{OD}$ is the radius from the centerline to the seal face inner diameter peripheral edge;

$r_g$ is the radius from the centerline to the circumferential terminal segment of the seal ring grooves; and the groove balance is in a range of between about 0.20 to about 0.85.

17. The gap type mechanical end face seal according to claim 16 wherein said groove balance is in a range of from about 0.23 to about 0.50.

18. The gap type mechanical end face seal according to claim 17 wherein said groove balance is approximately 0.3.

19. The gap type mechanical end face seal according to claim 16 further comprising a seal balance relationship between the sealing diameter of the primary ring secondary seal, $r_{SD}$, and the radial width of the groove area, as defined by the following equation:

$$\text{Seal Balance} = \frac{r_{OD}^2 - r_{SD}^2}{r_{OD}^2 - r_{ID}^2} \quad \text{for grooves open to the outer diameter peripheral edge; and} \quad (1)$$

$$\text{Seal Balance} = \frac{r_{SD}^2 - r_{ID}^2}{r_{OD}^2 - r_{ID}^2} \quad \text{for grooves open to the inner diameter peripheral edge} \quad (2)$$

where $r_{SD}$ is the radius from the centerline to the sealing diameter of said primary ring secondary seal, $r_{ID}$ is the radius from the centerline to the seal face inner diameter peripheral edge;

$r_{OD}$ is the radius from the centerline to the seal face outer diameter peripheral edge; and seal balance is in a range of between about 0.78 to about 0.82.

20. The gap type mechanical end face seal according to claim 19 wherein said seal balance is approximately 0.81.

21. A gap type mechanical end face seal arrangement having the first seal according to claim 1 and further comprising a second seal disposed outboard of said first seal, said first and second seals further being configured for axial disposition along a shaft and defining between them an intermediate chamber including a means for a connection to a source of pressurized, relatively inert gas.

22. The gap type mechanical end face seal arrangement according to claim 21 wherein said first seal has a seal balance of approximately 0.78 and said second seal has essentially identical elements to said first seal, and further includes a configuration for providing a seal balance of about 0.81.

23. The gap type mechanical end face seal arrangement according to claim 22 wherein said inboard seal has a groove balance of about 0.3 and the outboard seal has a groove balance between about 0.4 to about 0.5.

24. The gap type mechanical end face seal arrangement according to claim 21 wherein said inboard seal has a groove balance of about 0.3 and the outboard seal has a groove balance of between about 0.4 to about 0.5.

25. The gap type mechanical end face seal according to claim 21 wherein, upon installation of said seal, seal faces are essentially horizontal, to accommodate a shaft extending vertically through the bore in the housing.

26. The gap type mechanical end face seal arrangement according to claim 1, said mechanical end face seal including grooves which have a trailing edge that is at an angle relative to the peripheral edge to which said grooves open, said angle being in a range of from about 16° to about 22°.

27. The gap type mechanical end face seal arrangement according to claim 26 wherein said angle is about 19°.

28. The gap type mechanical end face seal according to claim 1, wherein said axially movable primary ring is configured to be sealed to a shaft, and said mating ring is configured to be sealed to a housing, wherein any deviation from axially concentric orientation of the seal face of said mating ring relative to the shaft is accommodated by the axial biasing means orienting and positioning said opposed mating seal face of said axially movable primary ring.

29. The gap type mechanical end face seal according to claim 28 wherein, upon installation of said seal, seal faces are essentially horizontal, to accommodate a shaft extending vertically through the bore in the housing.

30. The gap type mechanical end face seal according to claim 1 wherein, upon installation of said seal, seal faces are essentially horizontal, to accommodate a shaft extending vertically through the bore in the housing.

* * * * *